Figure 2:
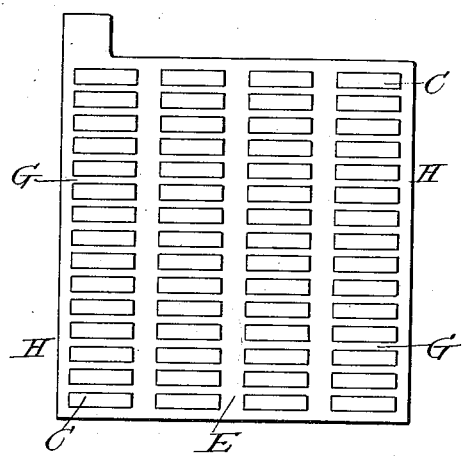

(No Model.)

R. M. HUNTER.
METHOD OF FORMING SECONDARY BATTERY ELECTRODES.

No. 397,235. Patented Feb. 5, 1889.

Attest:
Henry Drury
E. M. Breckinridge

Inventor:
R. M. Hunter

UNITED STATES PATENT OFFICE.

RUDOLPH M. HUNTER, OF PHILADELPHIA, PENNSYLVANIA.

METHOD OF FORMING SECONDARY-BATTERY ELECTRODES.

SPECIFICATION forming part of Letters Patent No. 397,235, dated February 5, 1889.

Application filed January 27, 1888. Serial No. 262,132. (No model.)

*To all whom it may concern:*

Be it known that I, RUDOLPH M. HUNTER, of the city and county of Philadelphia, and State of Pennsylvania, have invented an Improvement in Secondary Batteries, of which the following is a specification.

My invention has reference to the manufacture of secondary-battery elements; and it consists of certain improvements, which are fully set forth in the following specification and shown in the accompanying drawings, which form part thereof.

Heretofore it has been customary to make secondary-battery elements by placing previously-hardened cylinders or other forms of active material—such as oxide of lead—in molds and then cast a lead supporting an electric conducting-frame around said active material. The trouble experienced is that the lead is sluggish in its movement and will not flow readily into and through the long thin slits which are formed between the cylinders or blocks of hard active material held in the mold. As there are a very large number of these small slits, the danger of defect from this cause is very great. One defective cast of lead through a slit ruins the whole plate, and consequently a loss of the labor expended and to be expended in recovering the pieces of active material and the remelting of the lead. My object is to form such plates around the active material with a surety of success for every cast, and thus reduce the cost of production proportionally, and at the same time increase the capacity of the manufacturing plant. The molds which hold the active material should be made hot to prevent chilling of the flowing lead, and this heat with the employment of pure lead is unsatisfactorily high. In my improvement I am enabled to cause the flow of the lead at a much lower temperature without the least danger of the production of defective plates.

In carrying out my invention I place the active material in the form of long cylinders or pencils close to each other and held positively in a mold. This mold is then or previously warmed and preferably arranged on end, so as to obtain as great a pressure to the flowing lead as possible, and I then pour into the mold a very fluid mixture of lead and bismuth, which is far more fluid than lead alone, and when cast is chilled or cooled much more quickly. This saves much time in handling and a consequent reduction in cost. The lead is the main part of the fluid cast, and the amount of bismuth added may be varied to produce the fluidity desired. Its conductivity to electricity is less than that of lead, and its ductility when cold is also less; hence it is not desirable to use more than is absolutely necessary. The slits between the pieces of active material in the molds are, in the preferred form of plate, (see drawings,) very long and narrow, and are also very small in cross-section, and the lead in flowing through them comes in contact with walls on all sides of a lower temperature than the melting-point of lead, and hence the tendency to the chilling action and liability to defective plates being produced. It is evident that these channels must be as small as possible consistent with strength and conductivity, and the smaller I can make them in width the greater the area in a given sized battery of the surface of active material and the resulting capacity of the cell. It is therefore my object to reduce these bars of lead to the smallest size, and that too without the danger of producing defective plates. It is evident that while I have particular reference to plates made up of cylindrical pieces of active material that such pieces may be varied in form as found most convenient and satisfactory, and hence I do not limit myself to the details of the plate here shown.

Figure 3:
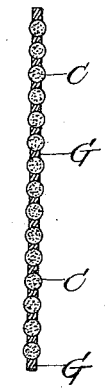
Figure 1:
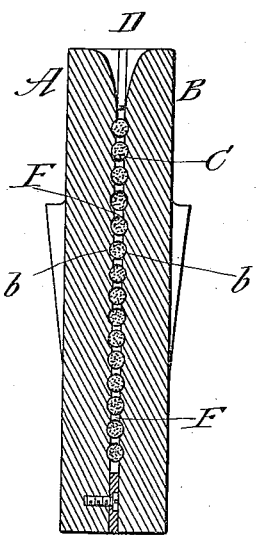

In the drawings, Figure 1 is a cross-section of a mold with the cylinders of active material held in place and ready for casting. Fig. 2 is a front elevation of the completed electrode or element, and Fig. 3 is a cross-section of same.

A is the mold, and may be formed in two halves, B B, removably clamped together, and provided with the grooves b, for holding the cylinders of active material, C, in place, and also a mouth, D, for the entrance of the metal to be cast around the cylinders C. This mouth is on the top end, so that in casting the metal flows to the bottom of the mold through the vertical channels arranged between the rows of cylinders forming the vertical bars E, and as it rises in the molds it ascends and runs laterally through the horizontal spaces F in the mold between the cylinders C and form the horizontal bars G of the electrode. The metal also rises, forming the bounding-bars H of the electrode. It is evident that the duty of these small passage-ways F is very great, and if the metal is not exceedingly fluid the lead will be liable to congeal in its passage and produce defective bars G.

It is evident that if I begin with a given temperature in the mold and active material pieces and cast from the bottom up I shall have the least temperature in the mold and active material when the lead is first poured in and when its pressure is greatest due to the column of lead pressing down upon that in the bottom of the mold, and as the hot lead rises in the mold the temperature of the mold and active material at the upper part will increase, and this increase will be substantially proportional to the decrease in pressure of the lead being cast, owing to the shortening of the column of the flowing lead. This will insure the lead flowing uniformly through the mold throughout the cast. It is evident that this advantage would be had if the mold was not heated before the cast, and would also exist without diluting the lead with bismuth or its equivalent.

In this application I do not claim the use of bismuth with lead as the compound for the supporting-plate.

Having now described my invention, what I claim as new, and desire to secure by Letters Patent, is—

The method of forming secondary-battery elements, consisting in warming the mold, arranging previously-formed pieces of active material close together and holding them rigidly in said mold, setting the mold on end, so that the active material pieces are located one above the other, and finally casting the fluid-conducting metal around said active material pieces while so held.

In testimony of which invention I hereunto set my hand.

RUDOLPH M. HUNTER.

Witnesses:
RICHD. S. CHILD, Jr.,
E. M. BRECKINREED.